(12) United States Patent
Zhang et al.

(10) Patent No.: US 11,216,099 B2
(45) Date of Patent: Jan. 4, 2022

(54) ARRAY SUBSTRATE AND MANUFACTURING METHOD THEREOF, DISPLAY PANEL AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Jingang Zhang, Beijing (CN); Kun Li, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/832,271

(22) Filed: Mar. 27, 2020

(65) Prior Publication Data

US 2021/0011571 A1 Jan. 14, 2021

(30) Foreign Application Priority Data

Jul. 12, 2019 (CN) .......................... 201910630212.0

(51) Int. Cl.
*G06F 3/044* (2006.01)
*G06F 3/041* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC .......... G06F 3/044; G06F 3/041; G06F 3/045; G02F 1/1337; G02F 1/1333;
(Continued)

(56) References Cited

U.S. PATENT DOCUMENTS

2012/0274603 A1   11/2012  Kim et al.
2018/0321547 A1*  11/2018  Li ........................ G02F 1/1368
(Continued)

FOREIGN PATENT DOCUMENTS

| CN | 104793401 A | 7/2015 |
| CN | 104808375 A | 7/2015 |
| CN | 104915062 A | 9/2015 |

OTHER PUBLICATIONS

First Chinese Office Action from Chinese Patent Application No. 201910630212.0 dated Feb. 7, 2021.

*Primary Examiner* — Pegeman Karimi
(74) *Attorney, Agent, or Firm* — Dilworth & Barrese, LLP.; Michael J. Musella, Esq.

(57) ABSTRACT

An array substrate and a manufacturing method thereof, a display panel, and a display device are provided. The array substrate includes a base substrate, gate lines and data lines, switch circuits, a common electrode layer, and a light shielding conductive layer. The gate lines and the data lines are on the base substrate and cross with each other to define pixel regions; the switch circuits are in the pixel regions; the common electrode layer is on a side of the switch circuits away from the base substrate; and the light shielding conductive layer is on the side of the switch circuits away from the base substrate and is electrically connected to the common electrode layer. At least a portion of an orthographic projection of the gate lines, the data lines and the switch circuits is within an orthographic projection of the light shielding conductive layer on the base substrate.

17 Claims, 9 Drawing Sheets

(51) Int. Cl.
  *G02F 1/1333* (2006.01)
  *G02F 1/1343* (2006.01)
  *G02F 1/1362* (2006.01)
  *G02F 1/1368* (2006.01)

(52) U.S. Cl.
  CPC .... *G02F 1/13439* (2013.01); *G02F 1/133345* (2013.01); *G02F 1/136209* (2013.01); *G02F 1/136286* (2013.01); *G06F 3/044* (2013.01); *G02F 1/136295* (2021.01); *G02F 2201/121* (2013.01); *G02F 2201/123* (2013.01); *G06F 2203/04103* (2013.01)

(58) Field of Classification Search
  CPC ......... G02F 1/136286; G02F 2201/121; G02F 1/133345
  See application file for complete search history.

(56) References Cited

U.S. PATENT DOCUMENTS

| | | | |
|---|---|---|---|
| 2019/0019816 A1* | 1/2019 | Kang | H01L 33/54 |
| 2019/0056620 A1* | 2/2019 | Akiyoshi | G02F 1/133514 |
| 2019/0086592 A1* | 3/2019 | Du | G02F 1/136227 |
| 2020/0166796 A1* | 5/2020 | Okuyama | H01L 27/124 |

\* cited by examiner

ARRAY SUBSTRATE AND MANUFACTURING METHOD THEREOF, DISPLAY PANEL AND DISPLAY DEVICE

This application claims priority of the Chinese Patent Application No. 201910630212.0, filed on Jul. 12, 2019. For all purposes under the U.S. law, the entire disclosure of the aforementioned application is incorporated by reference as part of the disclosure of this application.

TECHNICAL FIELD

Embodiments of the present disclosure relate to an array substrate and a manufacturing method thereof, a display panel, and a display device.

BACKGROUND

With the development of display technology, touch screens have been widely used. By replacing the mechanical button panel with a tactile feedback system, the touch screen provides a simple and convenient man-machine interaction mode. According to different working principles, touch screens can be divided into such as capacitive, resistive, infrared, and surface acoustic wave types. Among them, capacitive touch screens are most widely used. Capacitive touch screens are divided into touch screens using the mutual capacitance principle and the self-capacitance principle.

Touch screens using the principle of mutual capacitance are usually provided with transverse electrodes and longitudinal electrodes on the surface of the substrate, and capacitors may be formed where the transverse electrodes and the longitudinal electrodes cross. When a finger touches the screen, the coupling between two electrodes near the touch position is affected, thus changing the capacitance between the two electrodes. According to the change of capacitance, the coordinates of the touch position can be calculated.

The structure of touch screens using the self-capacitance principle usually includes a plurality of self-capacitance electrodes arranged on the same layer and insulated from each other, and each self-capacitance electrode is connected to the touch detection chip through leads. When the human body does not touch the screen, the capacitance provided by the respective capacitance electrodes is a fixed value. When the human body touches the screen, the capacitance of the self-capacitance electrode corresponding to the touch position is the fixed value superimposed on the human body capacitance, and the touch detection chip can obtain the coordinates of the touch position by detecting the change of the capacitance values of the respective capacitance electrodes.

SUMMARY

At least one embodiment of the present disclosure provides an array substrate and a manufacturing method thereof, a display panel, and a display device. By being provided with a light shielding conductive layer, the array substrate provided by at least one embodiment of the present disclosure can improve the pixel aperture ratio, simplify the manufacturing process, and reduce the signal delay of the common electrode.

At least one embodiment of the present disclosure provides an array substrate, including: a base substrate; a plurality of gate lines and a plurality of data lines on the base substrate, where the plurality of gate lines cross with and are insulated from the plurality of data lines to define at least one pixel region; a switch circuit in each of the at least one pixel region and electrically connected to one of the plurality of gate lines and one of the plurality of data lines; a common electrode layer on a side of the switch circuit away from the base substrate; and a light shielding conductive layer on the side of the switch circuit away from the base substrate and electrically connected to the common electrode layer; and at least a portion of an orthographic projection of the plurality of gate lines, the plurality of data lines and the switch circuit on the base substrate is within an orthographic projection of the light shielding conductive layer on the base substrate.

In some examples, the orthographic projection of the plurality of gate lines, the plurality of data lines and the switch circuit on the base substrate is within the orthographic projection of the light shielding conductive layer on the base substrate.

In some examples, the array substrate further includes an insulating layer between the light shielding conductive layer and the common electrode layer; and the insulating layer includes at least one via hole, and the light shielding conductive layer is electrically connected to the common electrode layer through the at least one via hole.

In some examples, the at least one via hole is in a region where the light shielding conductive layer overlaps with the switch circuit, the plurality of gate lines or the plurality of data lines in a direction perpendicular to the base substrate.

In some examples, the switch circuit is a thin film transistor and includes a channel region, and an orthographic projection of the at least one via hole on the base substrate overlaps with an orthographic projection of the channel region on the base substrate.

In some examples, the light shielding conductive layer is on a side of the common electrode layer close to the base substrate, or on a side of the common electrode layer away from the base substrate.

In some examples, the light shielding conductive layer is on a side of the common electrode layer away from the base substrate; the switch circuit is a thin film transistor and includes a channel region; and in each of the at least one pixel region, the common electrode layer is provided with an opening, and the opening overlaps with the channel region in a direction perpendicular to the base substrate.

In some examples, the array substrate further includes a pixel electrode in each of the at least one pixel region; and the switch circuit is a thin film transistor and includes a source electrode and a drain electrode, the pixel electrode is electrically connected to the source electrode or the drain electrode, the common electrode layer includes a common electrode in each of the at least one pixel region, and the common electrode overlaps with the pixel electrode in a direction perpendicular to the base substrate.

In some examples, a material of the light shielding conductive layer includes a metal material or an organic conductive material.

In some examples, the organic conductive material includes a resin material doped with graphite.

In some examples, the common electrode layer includes a plurality of common electrode elements insulated from each other, the light shielding conductive layer includes a plurality of touch wirings insulated from each other, and the plurality of common electrode elements are electrically connected to the plurality of touch wirings in one-to-one correspondence.

In some examples, the array substrate further includes an insulating layer between the light shielding conductive layer and the common electrode layer; and the insulating layer includes a plurality of via holes, and each of the plurality of common electrode elements is electrically connected to a corresponding touch wiring through at least one of the plurality of via holes.

In some examples, each of the plurality of common electrode elements overlaps with at least two pixel regions in a direction perpendicular to the base substrate.

In some examples, the light shielding conductive layer further includes a plurality of light shielding elements insulated from each other, and the plurality of common electrode elements are electrically connected to the plurality of light shielding elements in one-to-one correspondence.

At least one embodiment of the present disclosure further provides a display panel including the above array substrate.

At least one embodiment of the present disclosure further provides a display device including the above display panel.

At least one embodiment of the present disclosure further provides a manufacturing method of an array substrate, including: providing a base substrate; forming a plurality of gate lines and a plurality of data lines on the base substrate, where the plurality of gate lines cross with and are insulated from the plurality of data lines to define at least one pixel region; forming a switch circuit in each of the at least one pixel region on the base substrate, where the switch circuit is electrically connected to one of the plurality of gate lines and one of the plurality of data lines; forming a common electrode layer on a side of the switch circuit away from the base substrate; and forming a light shielding conductive layer on the side of the switch circuit away from the base substrate; and the light shielding conductive layer is electrically connected to the common electrode layer, and at least a portion of an orthographic projection of the plurality of gate lines, the plurality of data lines and the switch circuit on the base substrate is within an orthographic projection of the light shielding conductive layer on the base substrate.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Similarly, similar words such as "a", "an" or "the" do not denote a limitation of quantity, but rather denote the presence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "Upper", "lower", "left", "right", etc. are only used to indicate the relative positional relationship, and when the absolute position of the object to be described is changed, the relative positional relationship can also change accordingly.

Figure 1:
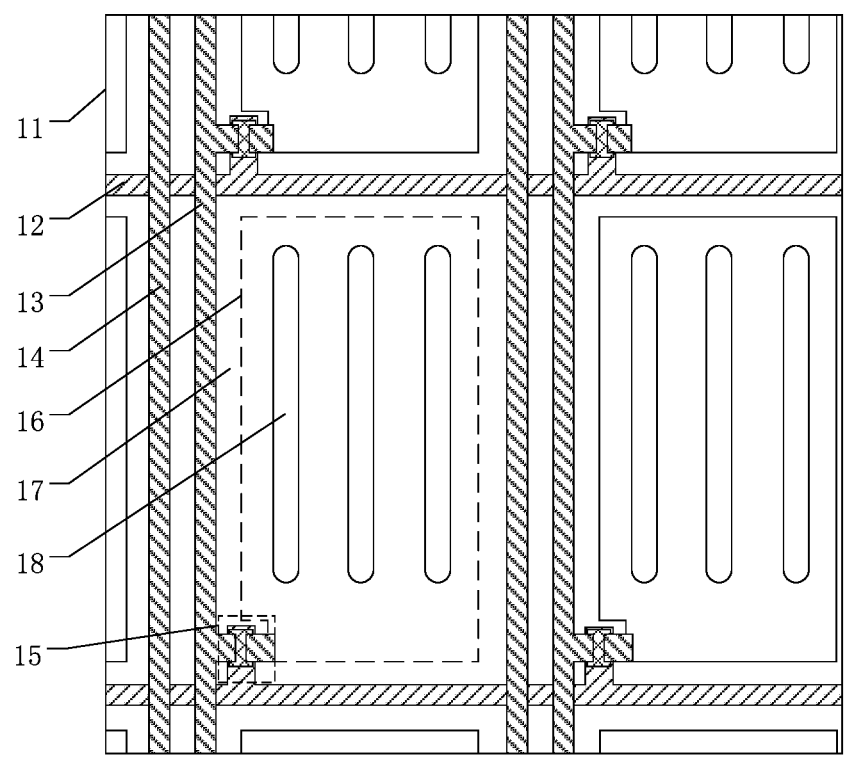
FIG. 1 is a schematic structural diagram of a touch display substrate.

FIG. 1 is a schematic structural diagram of a touch display substrate. The touch display substrate is an array substrate used for such as a touch liquid crystal display device. As illustrated in FIG. 1, the touch display substrate includes a base substrate 11, a plurality of gate lines 12, a plurality of data lines 13, a plurality of switch circuits 15, a plurality of pixel electrodes 16, a plurality of common electrodes 17, and a plurality of touch wirings 14. The gate lines 12 and the data lines 13 are arranged on the base substrate 11, and the gate lines 12 cross with and are insulated from the data lines 13 to define a plurality of pixel regions. The switch circuit 15 is located in the pixel region and is electrically connected to the gate line 12 and the data line 13 to receive a scanning signal from the gate line 12 and a data signal from the data line 13, respectively. The pixel electrode 16 is located in the pixel region and is electrically connected to the switch circuit 15. When the switch circuit 15 is turned on under the control of the received scanning signal, the pixel electrode 16 can be charged and discharged using the received data signal. The common electrode 17 is located above the pixel electrode 16 (with reference to the dotted line frame in FIG. 1) and is insulated from the pixel electrode 16. The common electrode 17 is a plate-shaped electrode, and is provided with a slit 18 to partially expose the underlying pixel electrode 16. Except for the region where the slit 18 is located, in a direction perpendicular to the base substrate 11, the common electrode 17 covers the entire pixel region, the gate line 12, the data line 13, and the switch circuit 15, that is, the common electrode 17 covers all regions in FIG. 1 except for the region where the slit 18 is located. The touch wiring 14 is electrically connected to the common electrode 17. In addition to cooperating with the pixel electrode 16 during the display operation, the common electrode 17 can further be used as a touch electrode during the touch operation. When the common electrode 17 is used for the display operation, the touch wiring 14 is used for transmitting a common voltage signal. When the common electrode 17 is further used as the touch electrode, the touch wiring 14 is further used to transmit electrical signals of the touch electrode. The presence of the touch wiring 14 increases the area of the shielding region of the pixel region and reduces the pixel aperture ratio. For high-resolution liquid crystal display products, the reduction of pixel aperture ratio means that the backlight power needs to be increased, thus further generating the problems of large power consumption, poor heat dissipation and the like, which is not beneficial for the application and promotion of touch display panels.

At least one embodiment of the present disclosure provides an array substrate and a manufacturing method thereof, a display panel, and a display device. Compared with, for example, the touch display substrate of FIG. 1, by being provided with a light shielding conductive layer electrically connected to the common electrode, the array substrate provided by at least one embodiment of the present disclosure can improve the pixel aperture ratio, simplify the manufacturing process, and reduce the signal delay of the common electrode.

Hereinafter, embodiments of the present disclosure will be described in detail with reference to the accompanying drawings. It should be noted that the same reference numerals will be used in the different drawings to refer to the described elements having the same or similar structures.

Figure 2A:
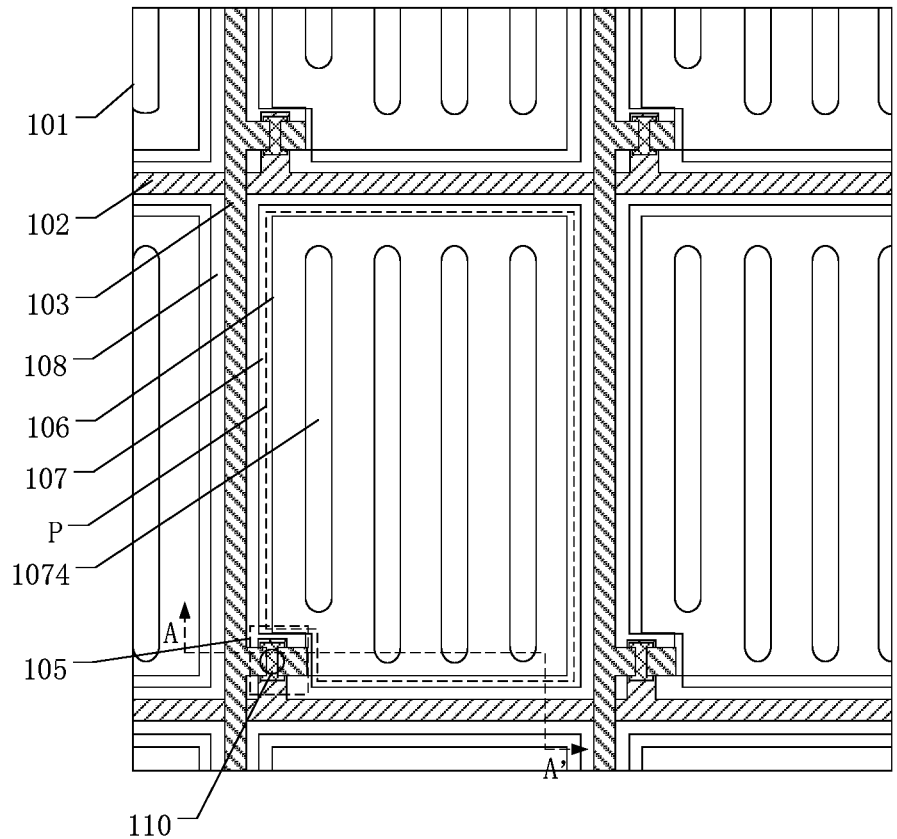
FIG. 2A is a schematic structural diagram of an array substrate according to at least one embodiment of the present disclosure.
Figure 2B:
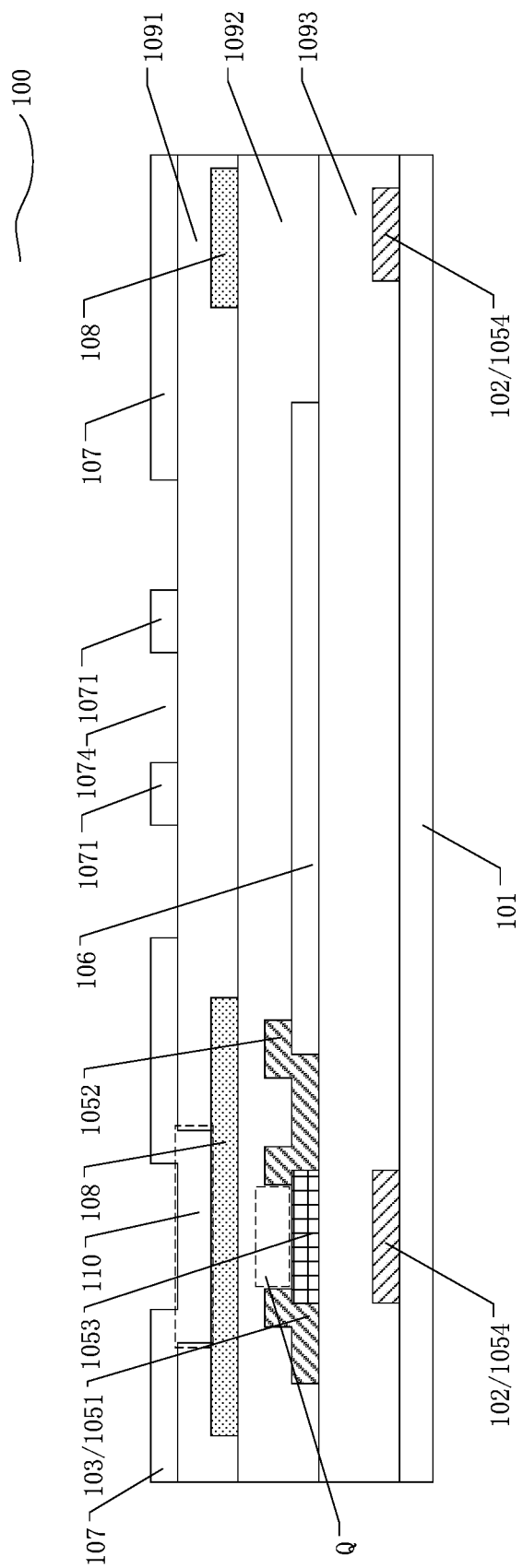
FIG. 2B is a schematic cross-sectional structural view of the array substrate illustrated in FIG. 2A along a line A-A'.

FIG. 2A is a schematic structural diagram of an array substrate according to at least one embodiment of the present disclosure, and FIG. 2B is a schematic cross-sectional structural view of the array substrate illustrated in FIG. 2A along a line A-A'.

As illustrated in FIGS. 2A and 2B, at least one embodiment of the present disclosure provides an array substrate 100, which can be applied to touch liquid crystal display panels. The array substrate 100 includes a first base substrate 101, a plurality of gate lines 102 and a plurality of data lines 103, a plurality of switch circuits 105, a common electrode layer 107, and a light shielding conductive layer 108. The gate lines 102 and the data lines 103 are located on the first base substrate 101, and the gate lines 102 cross with and are insulated from the data lines 103 to define at least one pixel region P. The switch circuit 105 is located in the pixel region P, for example, at a position where the gate line 102 and the data line 103 cross each other, and the switch circuit 105 is connected to the gate line 102 and the data line 103 to receive a scanning signal from the gate line 102 and a data signal from the data line 103, respectively. The common electrode layer 107 is located on a side of the switch circuit 105 away from the first base substrate 101; and in a direction perpendicular to the first base substrate 101, the common electrode layer 107 at least partially covers the at least one pixel region P, and further can at least partially cover the gate lines 102, the data lines 103, and the switch circuits 105. The light shielding conductive layer 108 is located on the side of the switch circuit 105 away from the first base substrate 101. The light shielding conductive layer 108 at least partially overlaps with the common electrode layer 107 in the direction perpendicular to the first base substrate 101, and is electrically connected to the common electrode layer 107. As illustrated in the figure, at least a portion of the orthographic projection of the gate lines 102, the data lines 103 and the switch circuits 105 on the first base substrate 101 is within the orthographic projection of the light shielding conductive layer 108 on the first base substrate 101.

In some examples, the first base substrate 101 is a transparent insulating substrate. For example, the first base substrate 101 can be a glass substrate or a quartz substrate, or a substrate made of other suitable materials.

In some examples, although FIG. 2A illustrates two gate lines 102 and two data lines 103 as an example, both the gate lines 102 and the data lines 103 can be more. These gate lines 102 cross with and are insulated from these data lines 103, and these gate lines 102 and data lines 103 define a plurality of pixel regions P arranged in an array. One complete pixel region P is illustrated as an example in the figure, and other pixel regions P can be the same as that. The materials used for the gate lines 102 and the data lines 103 can be, for example, copper, copper alloy, aluminum, aluminum alloy, and other conductive materials.

The light shielding conductive layer 108 has properties of opacity and conductivity. In some examples, the material used for the light shielding conductive layer 108 can be an opaque metal material, such as metal cadmium or the like. Alternatively, the material used for the light shielding conductive layer 108 can be a black organic conductive material, such as an organic material doped with conductive particles such as graphite. In some examples, the surface of the side, away from the first base substrate 101, of the light shielding conductive layer 108 can also be roughened to reduce the reflectivity of ambient light incident from outside, thereby further improving the display effect.

Compared with the touch display substrate illustrated in FIG. 1, in the array substrate provided by at least one embodiment of the present disclosure, the light shielding conductive layer is provided on the array substrate and covers at least part of gate lines, data lines and switch circuits, thus playing the role of a black matrix, reducing the deviation between the array substrate and the opposite substrate caused by the cell forming precision, and improving the pixel aperture ratio.

In some examples, the light shielding conductive layer 108 is arranged in the extending direction of the gate line 102 and/or the data line 103. For example, the light shielding conductive layer 108 includes a first portion arranged in the extending direction of the gate line 102, for example, the first portion is a strip-shaped portion, and the orthographic projection of the gate line 102 on the first base substrate 101 is within the orthographic projection of the light shielding conductive layer 108 on the first base substrate 101. For another example, the light shielding conductive layer 108 includes a second portion arranged in the extending direction of the data line 103, for example, the second portion is also a strip-shaped portion, and the orthographic projection of the data line 103 on the first base substrate 101 is within the orthographic projection of the light shielding conductive layer 108 on the first base substrate 101. For still another example, the light shielding conductive layer 108 includes a first portion arranged in the extending direction of the gate line 102, and a second portion arranged in the extending direction of the data line 103. For example, the first portion and the second portion are both strip-shaped portions, and the orthographic projection of the gate line 102 and the orthographic projection of the data line 103 on the first base substrate 101 both are within the orthographic projection of the light shielding conductive layer 108 on the first base substrate 101. Further, the light shielding conductive layer 108 includes a third portion overlapping with the switch circuit 105 in the direction perpendicular to the first base substrate 101, for example, the third portion is a square block-shaped portion, and the orthographic projection of the switch circuit 105 on the first base substrate 101 is also within the orthographic projection of the light shielding conductive layer 108 on the first base substrate 101. Thus, in at least one example, the orthographic projection of the gate line 102, the orthographic projection of the data line 103, and the orthographic projection of the switch circuit 105 on the first base substrate 101 are all within the orthographic projection of the light shielding conductive layer 108 on the first base substrate 101. In this way, the light shielding conductive layer can have a better shielding effect on the gate line, the data line and the switch circuit, thereby having the effect of improving the display effect.

In some examples, as illustrated in FIG. 2B, the light shielding conductive layer 108 can be located on a side of the common electrode layer 107 close to the first base substrate 101. As illustrated in FIG. 3B, the light shielding conductive layer 108 can also be located on the side of the common electrode layer 107 away from the first base substrate 101. These examples will be further described below.

In some examples, the array substrate 100 further includes a first insulating layer 1091. As illustrated in FIG. 2B, the first insulating layer 1091 is located between the light shielding conductive layer 108 and the common electrode layer 107, so that the light shielding conductive layer 108 and the common electrode layer 107 are insulated from each other at positions separated by the first insulating layer 1091. In addition, as illustrated in FIGS. 2A and 2B, at least one via hole 110 is provided at at least one position where the first insulating layer 1091 overlaps with the light shielding conductive layer 108 and the common electrode layer 107, so that the light shielding conductive layer 108 and the common electrode layer 107 are electrically connected through the at least one via hole 110.

The first insulating layer 1091 is a transparent insulating layer, and in some examples, the material of the first insulating layer 1091 can be an inorganic material, such as silicon oxide ($SiO_x$), silicon nitride ($SiN_x$), or other suitable materials. The material of the first insulating layer 1091 can also be an organic material, such as polyimide, polyacrylic resin, or other suitable materials.

In some examples, the via hole 110 can be located in a region where the light shielding conductive layer 108 overlaps with the switch circuit 105, the gate line 102, or the data line 103 in the direction perpendicular to the first base substrate 101, or can be located outside the region where the light shielding conductive layer 108 overlaps with the switch circuit 105, the gate line 102, or the data line 103 in the direction perpendicular to the first base substrate 101.

In some examples, as illustrated in FIG. 2B, the switch circuit 105 includes a channel region Q, and the via hole 110 is provided above the channel region Q of the switch circuit 105, i.e., the orthographic projection of the via hole 110 on the first base substrate 101 at least partially overlaps with the orthographic projection of the channel region Q of the switch circuit 105 on the first base substrate 101. Because the active layer (including the channel region Q) of the switch circuit 105 has a larger width relative to the width of the gate line 102 or the data line 103, the via hole can be formed to be relatively large, thereby reducing process requirements and improving the electrical connection between the common electrode layer and the light shielding conductive layer. Further, providing the via hole above the channel region of the switch circuit can reduce the width of the light shielding conductive layer in the extending direction of the gate line and the data line, thereby reducing the light shielding area and further improving the pixel aperture ratio.

Figure 3A:
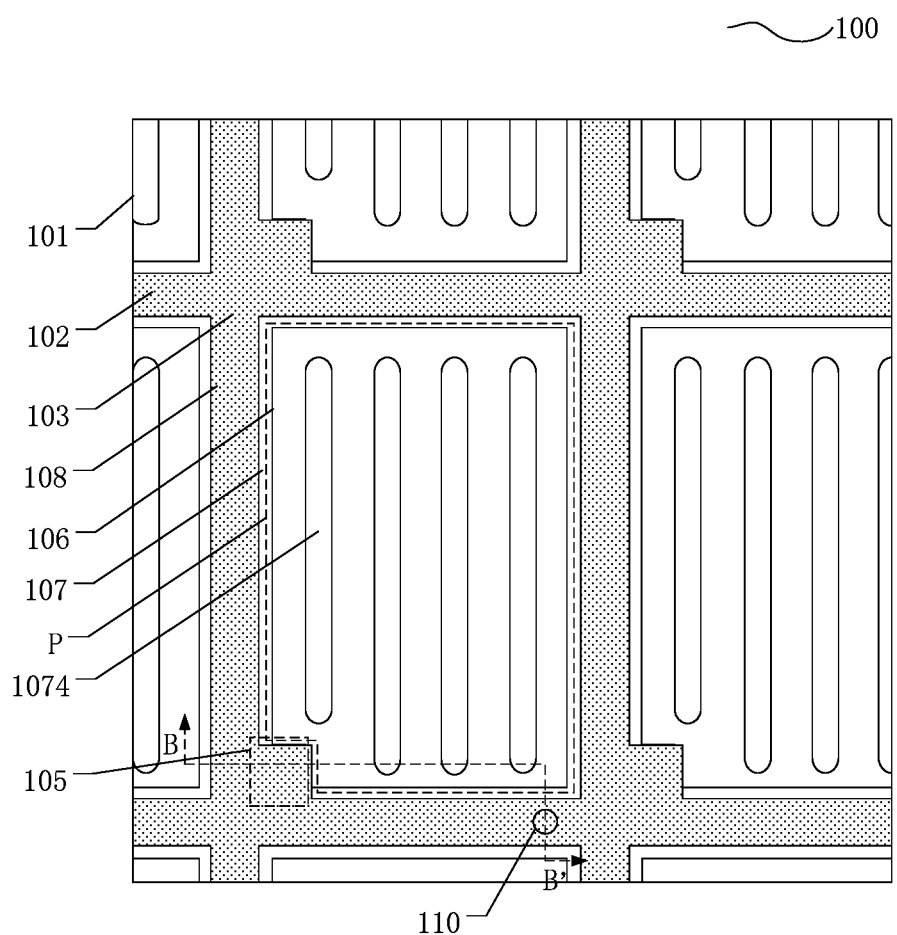
FIG. 3A is a schematic structural diagram of another array substrate according to at least one embodiment of the present disclosure.
Figure 3B:
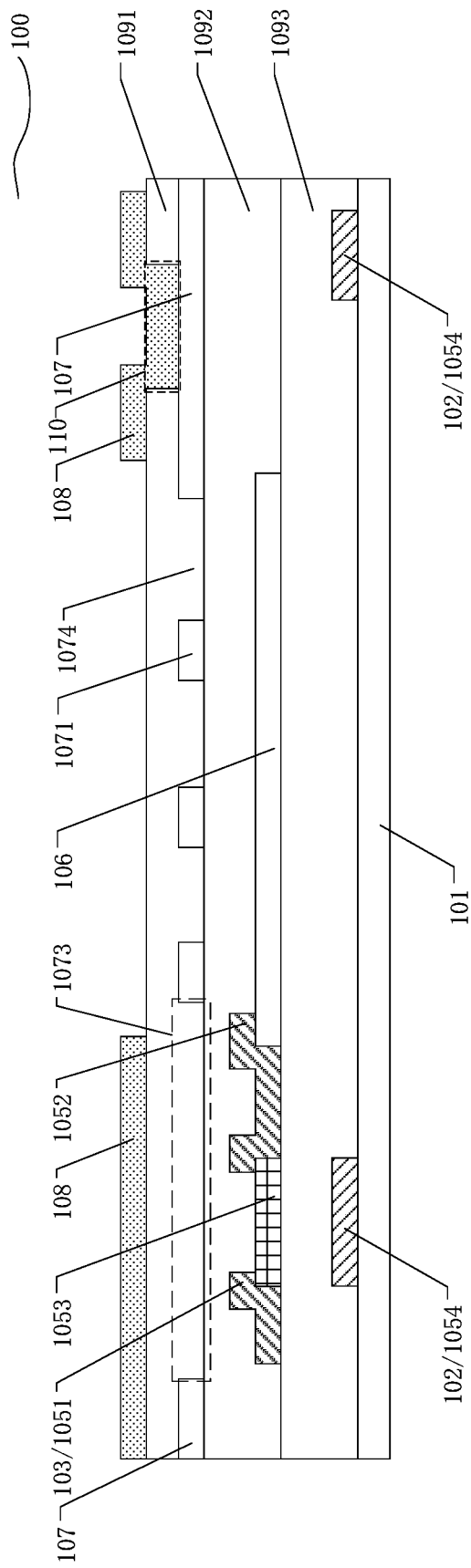
FIG. 3B is a schematic cross-sectional structural view of the array substrate illustrated in FIG. 3A along a line B-B'.

FIG. 3A is a schematic structural diagram of another array substrate according to at least one embodiment of the present disclosure, and FIG. 3B is a schematic cross-sectional structural view of the array substrate illustrated in FIG. 3A along a line B-B'. The structure of the array substrate illustrated in FIG. 3A is substantially the same as that of the array substrate illustrated in FIG. 2A, and their differences are the positions of via holes and the up-down relationship between the common electrode layer and the light shielding conductive layer. Therefore, the same names and reference numerals are used for elements having the same or similar structures.

As illustrated in FIG. 3B, in the array substrate 100 provided by at least one embodiment of the present disclosure, the light shielding conductive layer 108 is located on the side of the common electrode layer 107 away from the first base substrate 101. The via hole 110 is formed in the first portion, extending along the gate line 102, of the light shielding conductive layer 108, i.e., the via hole 110 is located above the gate line 102. The orthographic projection of the via hole 110 on the first base substrate 101 can partially overlap with the orthographic projection of the gate line 102 on the first base substrate 101. In addition, it should be noted that the via hole 110 can also be formed in the second portion, extending along the data line 103, of the light shielding conductive layer 108, that is, the via hole 110 is located above the data line 103. The orthographic projection of the via hole 110 on the first base substrate 101 can partially overlap with the orthographic projection of the data line 103 on the first base substrate 101.

Also, in this example, in the pixel region P, an opening 1073 is provided on the common electrode layer 107. The opening 1073 is located above the channel region Q of the switch circuit 105, that is, the opening 1073 at least partially overlaps with the channel region Q of the switch circuit 105 in the direction perpendicular to the first base substrate 101.

Because the common electrode layer is closer to the switch circuit in the case where the light shielding conductive layer is located on the side of the common electrode layer away from the first base substrate, the common electrode layer can cause electrical signal interference to the switch circuit. In this case, an opening is provided at the corresponding position of the common electrode layer above the channel region of the switch circuit, which is beneficial to reducing the electrical signal interference of the common electrode layer on the channel region, thus being beneficial to improving the display effect of the display panel using the array substrate 100.

In some examples, as illustrated in FIGS. 2A to 3B, the array substrate 100 further includes a pixel electrode 106 located in the pixel region P. The switch circuit 105 is a thin film transistor and includes a source electrode 1051, a drain electrode 1052, a semiconductor layer 1053, and a gate electrode 1054. The semiconductor layer 1053 is located directly above the gate electrode 1054 and is respectively connected to the source electrode 1051 and the drain electrode 1052. The gate electrode 1054 is insulated from the source electrode 1051, the drain electrode 1052, and the semiconductor layer 1053. The pixel electrode 106 can be electrically connected to one of a group consisting of the source electrode and drain electrode of the thin film transistor, and the data line can be electrically connected to the other of the group consisting of the source electrode and the drain electrode. In the example illustrated in FIGS. 2B and 3B, the pixel electrode 106 is electrically connected to the drain electrode 1052, the data line 103 is electrically connected to the source electrode 1051, and the gate line 102 is electrically connected to the gate electrode 1054. The switch circuit 105 is configured to turn on or turn off the connection between the data line 103 and the pixel electrode 106 according to the scanning signal provided by the gate line 102, thereby allowing or turning off the charging of the pixel electrode 106 by the data signal. The common electrode layer 107 includes a common electrode 1071 located in the pixel region P, and the common electrode 1071 and the pixel electrode 106 overlap in the direction perpendicular to the first base substrate 101.

In some examples, as illustrated in FIGS. 2A to 3B, the common electrode 1071 is provided with a plurality of slits 1074, and an orthographic projection of the slits 1074 in the direction perpendicular to the first base substrate 101 overlaps with an orthographic projection of the pixel electrode 106 in the direction perpendicular to the first base substrate 101. The slit 1074 is used to enable the electric field between the pixel electrode 106 and the common electrode 1071 to act on the liquid crystal layer, thereby driving the liquid crystal molecules to rotate and realizing the display function. It should be noted that the specific structure of the slit can be designed according to specific conditions, and the embodiments of the present disclosure are not limited to this.

In some examples, the data line 103 can be arranged on the same layer as the source electrode 1051 and drain electrode 1052, and the gate line 102 can be arranged on the same layer as the gate electrode 1054. For example, in the example illustrated in FIGS. 2B and 3B, the data line 103 and the source electrode 1051 are formed through the same process, and the gate line 102 and the gate electrode 1054 are formed through the same process.

In some examples, as illustrated in FIGS. 2B and 3B, the array substrate 100 is further provided with a second insulating layer 1092. The second insulating layer 1092 is located above the switch circuit 105 and below the common electrode layer 107 and the light shielding conductive layer 108, and covers the switch circuit 105 and the pixel electrode 106. Therefore, the pixel electrode 106 and the common electrode layer 107 are insulated from each other.

The second insulating layer 1092 is a transparent insulating layer, and in some examples, the material of the second insulating layer 1092 can be an inorganic material, such as silicon oxide ($SiO_x$), silicon nitride ($SiN_x$), or other suitable materials. The material of the second insulating layer 1092 can also be an organic material, such as polyimide, polyacrylic resin, or other suitable materials.

In some examples, as illustrated in FIGS. 2B and 3B, the array substrate 100 is further provided with a third insulating layer 1093. The third insulating layer 1093 is located between the gate electrode 1054 and the semiconductor layer 1053, and is used for insulating the gate electrode 1054 from the semiconductor layer 1053, that is, the third insulating layer 1093 is commonly referred to as a gate insulating layer.

The third insulating layer 1093 is a transparent insulating layer, and in some examples, the material of the third insulating layer 1093 can be an inorganic material, such as silicon oxide ($SiO_x$), silicon nitride ($SiN_x$), or other suitable materials. The material of the third insulating layer 1093 can also be an organic material, such as polyimide, polyacrylic resin, or other suitable materials.

It should be noted that FIGS. 2A to 3B are only illustrated by taking the case where the thin film transistor is a bottom gate type thin film transistor as an example, but the thin film transistor can also be other types of thin film transistors, such as a top gate type thin film transistor, a double gate type thin film transistor, etc. In the top gate type thin film transistor, the gate electrode and the third insulating layer can be located above the source electrode and drain electrode.

In some examples, the common electrode 1071 and the pixel electrode 106 are made of transparent conductive materials. For example, transparent metal oxides such as indium tin oxide (ITO), indium zinc oxide (IZO), indium gallium zinc oxide, and the like can be used.

In the array substrate 100 provided by the embodiments of FIGS. 2A to 3B, the common electrode layer 107 can further be used as a touch electrode, and a portion of the light shielding conductive layer 108 can further be used as a touch wiring. Therefore, the display panel including the array substrate 100 can have both a display function and a touch function, and the touch function thereof will be further described below.

Figure 4:
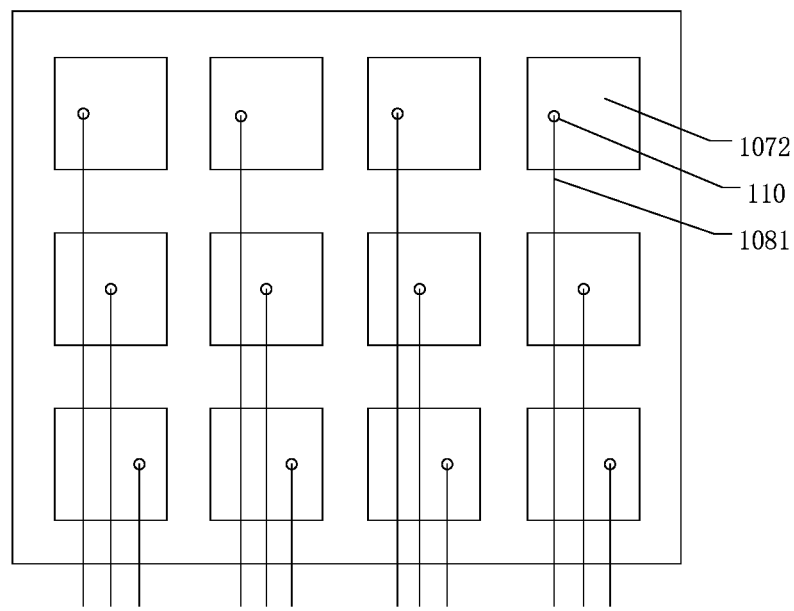
FIG. 4 is a schematic diagram of touch wirings of an array substrate according to at least one embodiment of the present disclosure.

FIG. 4 is a schematic diagram of touch wirings of an array substrate according to at least one embodiment of the present disclosure. As illustrated in FIG. 4, the common electrode layer 107 includes a plurality of common electrode elements 1072 insulated from each other, that is, the common electrode layer 107 is divided into a plurality of common electrode elements 1072 insulated from each other. The light shielding conductive layer 108 includes a plurality of touch wirings 1081 that are insulated from each other, that is, a portion of the light shielding conductive layer 108 is formed as a plurality of touch wirings 1081, and the touch wirings 1081 are formed of, for example, a strip-shaped portion overlapping with a gate line or a data line and insulated from other portions of the light shielding conductive layer 108. For example, in the case illustrated in FIG. 4, although the touch wiring 1081 can pass through other common electrode elements 1072 (i.e., overlap with the common electrode elements 1072), the touch wiring 1081 is insulated from the portion, corresponding to the overlapping common electrode elements 1072, of the light shielding conductive layer 108. The insulation can be realized by, for example, electrically connecting other light shielding conductive layer portions on both sides of the touch wiring 1081 to each other through the common electrode elements 1072. The plurality of common electrode elements 1072 are electrically connected to the plurality of touch wirings 1081 in one-to-one correspondence. The plurality of common electrode elements 1072 can be further used as touch electrodes, and correspondingly, the plurality of touch wirings 1081 can further be used as touch signal lines of the touch electrodes. In addition, the plurality of touch wirings 1081 can also be used as common electrode lines for providing common voltage signals to the common electrode elements 1072. Thus, the array substrate 100 can realize integration of the touch control function and display function. The principle for the array substrate 100 to realize touch is the self-capacitance principle, i.e., each of the common electrode elements 1072 serves as a self-capacitance touch electrode.

In some examples, the number of via holes 110 is plural, and each common electrode element 1072 is electrically connected to a corresponding touch wiring 1081 through the via hole 110. As illustrated in FIG. 4, each common electrode element 1072 and the corresponding touch wiring 1081 can be electrically connected through at least one via hole 110.

Hereinafter, with reference to FIGS. 5A and 5B, two methods for realizing mutual insulation of the plurality of touch wirings 1081 and one-to-one corresponding electrical connection with the plurality of common electrode elements 1072 are exemplarily described. It should be noted that there can be various methods for realizing mutual insulation of the plurality of touch wirings 1081 and one-to-one corresponding electrical connection with the plurality of common electrode elements 1072, and the present disclosure is not limited thereto.

Figure 5A:
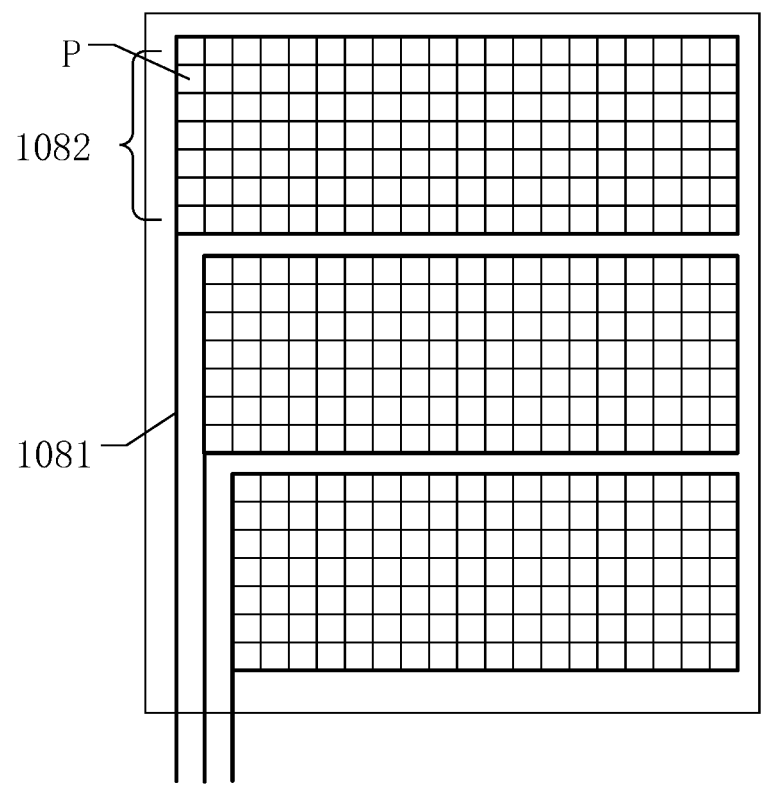
FIG. 5A is a partially enlarged schematic view of a light shielding conductive layer pattern of an array substrate according to at least one embodiment of the present disclosure.

FIG. 5A is a partially enlarged schematic view of a light shielding conductive layer pattern of an array substrate according to at least one embodiment of the present disclosure, and illustrates a method of realizing mutual insulation of a plurality of touch wirings 1081. As illustrated in FIG. 5A, each grid represents one pixel region P. The light shielding conductive layer 108 further includes a plurality of light shielding elements 1082 insulated from each other, and the plurality of common electrode elements 1072 are electrically connected to the plurality of light shielding elements 1082 in one-to-one correspondence. Each light shielding element 1082 corresponds to a plurality of pixel regions P, the plurality of pixel regions P are located within the range of the light shielding element 1082, and each light shielding element 1082 is connected to a touch wiring 1081. Each touch wiring 1081 is led out by a strip-shaped portion, extending in the direction of the gate line 102 or the data line 103, of the light shielding conductive layer 108, and the touch wiring 1081 is insulated from other touch electrodes. The pattern of the light shielding conductive layer can be realized by a patterning process.

In some examples, each common electrode element 1072 overlaps with at least two pixel regions P in the direction perpendicular to the first base substrate 101, i.e., each common electrode element 1072 is shared by the at least two pixel regions P. Further for example, each common electrode element 1072 overlaps with the pixel regions P of M rows×N columns, that is, each common electrode element 1072 is shared by the pixel regions P of M rows×N columns, and M and N are both integers greater than or equal to 2.

In some examples, the orthographic projection of each light shielding element 1082 on the first base substrate 101 coincides with the orthographic projection of the corresponding common electrode element 1072 on the first base substrate 101, and is located within the orthographic projection of the corresponding common electrode element 1072 on the first base substrate 101.

It should be noted that the common electrode element 1072 is larger than at least one pixel region P, and each common electrode element 1072 can generally cover a plurality of pixel regions P. Therefore, each common electrode element 1072 and the corresponding light shielding element 1082 can be electrically connected through a via hole 110 as long as the via hole 110 is located in a region where the common electrode element 1072 and the light shielding element 1082 overlap. Alternatively, each common electrode element 1072 and the corresponding light shielding element 1082 can be electrically connected through a plurality of via holes 110, and the plurality of via holes 110 are all located in a region where the common electrode element 1072 overlaps with the light shielding element 1082. The plurality of via holes are more beneficial to realizing electrical connection between the common electrode element and the light shielding element, and signal transmission resistance is reduced through parallel connection between the plurality of connection points (via holes).

Figure 5B:
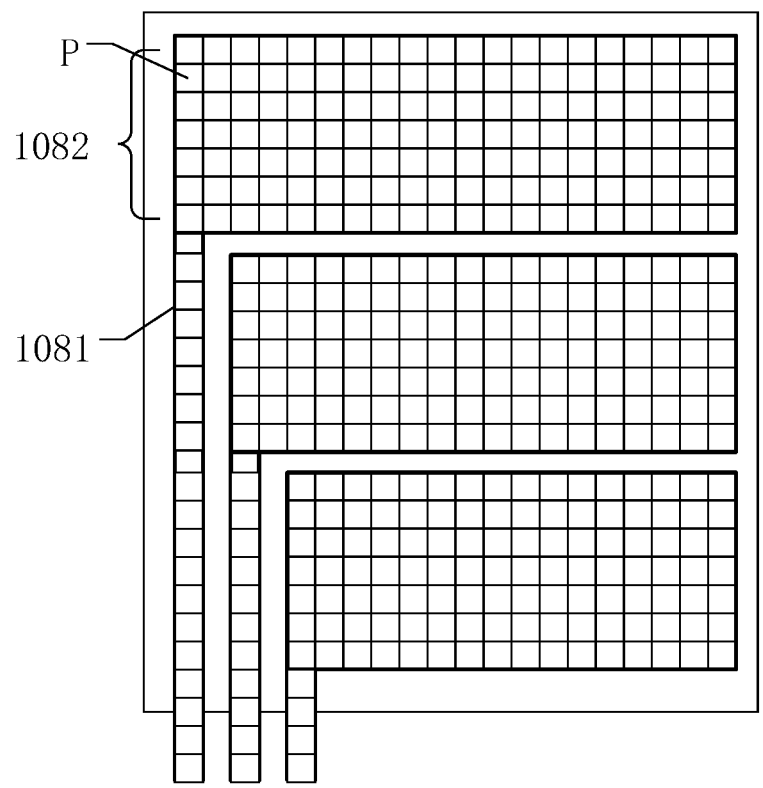
FIG. 5B is a partially enlarged schematic view of another light shielding conductive layer pattern of an array substrate according to at least one embodiment of the present disclosure.

FIG. 5B is a partially enlarged schematic view of another light shielding conductive layer pattern of an array substrate according to at least one embodiment of the present disclosure, and illustrates another method of realizing mutual insulation of a plurality of touch wirings 1081. As illustrated in FIG. 5B, each touch wiring 1081 can be composed of two strip-shaped portions, extending in the direction of the gate line 102 or the data line 103, of the light shielding conductive layer. It should be noted that the two strip-shaped portions of the light shielding conductive layer extending in the direction of the gate line 102 or the data line 103 need to be connected to the same pin of a touch detection chip when accessing the touch detection chip. In this case, the resistance of the touch wiring 1081 can be reduced, thereby reducing the signal delay. Of course, each touch wiring 1081 can also be composed of a plurality of strip-shaped portions, extending in the direction of the gate line 102 or the data line 103, of the light shielding conductive layer.

For the array substrate integrated with touch and display functions provided by at least one embodiment of the present disclosure, because the light shielding conductive layer can further be used as touch wirings of the touch electrodes, there is no need to additionally provide touch wirings on the array substrate, thus further improving the pixel aperture ratio and simplifying the manufacturing process. In addition, the light shielding conductive layer can be made of a metal material, and the common electrode lead is a transparent metal oxide film. The resistivity of the metal material is lower than that of the transparent metal oxide, so when the light shielding conductive layer is used as touch wirings, the signal delay of the common electrode can be reduced.

At least one embodiment of the present disclosure further provides a display panel including the array substrate of any one of the above embodiments of the present disclosure.

Figure 6:
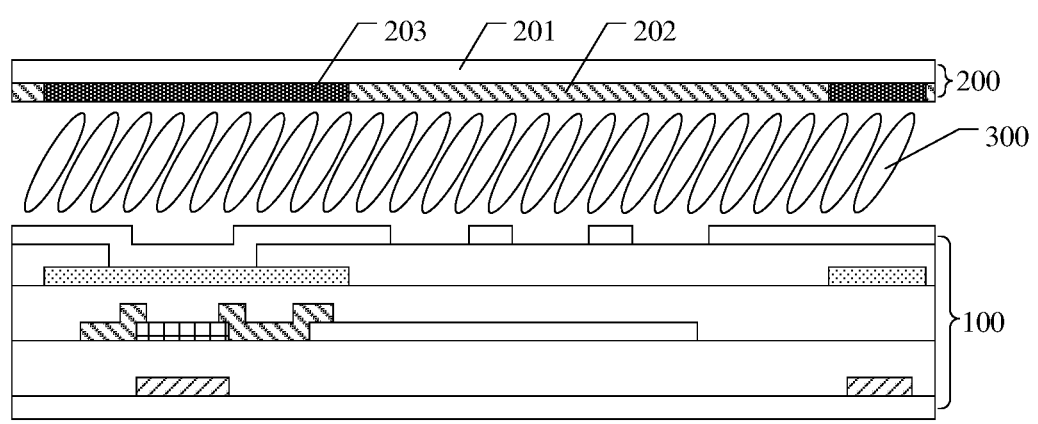
FIG. 6 is a schematic structural diagram of a display panel according to at least one embodiment of the present disclosure.

FIG. 6 is a schematic structural diagram of a display panel according to at least one embodiment of the present disclosure. As illustrated in FIG. 6, the display panel further includes an opposite substrate 200 opposite to the array substrate 100, and a liquid crystal layer 300 located between the array substrate 100 and the opposite substrate 200. The opposite substrate 200 includes a second base substrate 201 and a color filter layer 202, and the color filter layer 202 is arranged on the second base substrate 201, for example, on a side of the second base substrate 201 facing the array substrate 100.

In some examples, the opposite substrate 200 can further include a black matrix 203 arranged on the second base substrate 201, for example, on a side of the second base substrate 201 facing the array substrate 100. In addition, because the array substrate 100 is provided with the light shielding conductive layer 108, the gate lines, data lines, and switch circuits can be shielded, so that the light shielding conductive layer 108 performs the same function as the black matrix 203. Therefore, the black matrix may also not be provided on the opposite substrate 200.

The display panel provided by at least one embodiment of the present disclosure has the same beneficial effects as the above array substrate, and details will not be described here again.

At least one embodiment of the present disclosure further provides a display device including the display panel of the above embodiments. The display device can be realized as any product or component with a display function, such as a liquid crystal panel, an electronic paper, an organic light-emitting diode (OLED) panel, a mobile phone, a tablet computer, a television, a display, a notebook computer, a digital photo frame, a navigator, etc.

Figure 7:
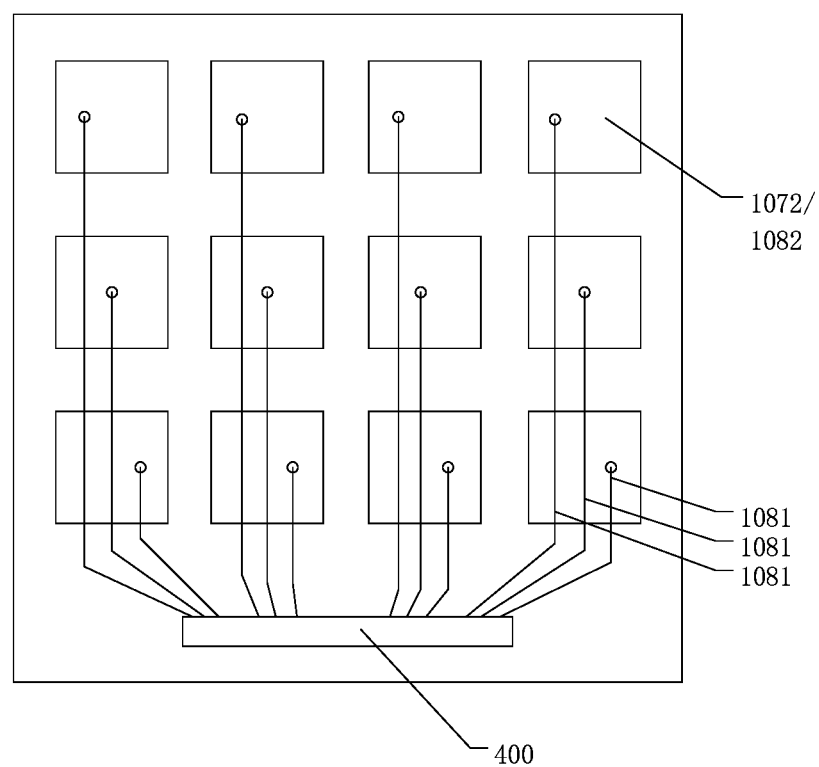
FIG. 7 is a schematic diagram of touch wirings of a display device according to at least one embodiment of the present disclosure.

FIG. 7 is a schematic diagram of touch wirings of a display device according to at least one embodiment of the present disclosure. The display device further includes a touch detection chip 400 located in the peripheral region outside the display region. The touch detection chip 400 is connected to the array substrate through, for example, a bonding region and a flexible lead circuit board, and each touch wiring 1081 of the array substrate is electrically connected to the touch detection chip 400. The touch detection chip 400 is, for example, an integrated circuit (IC) chip.

The display device provided by at least one embodiment of the present disclosure has the same beneficial effects as the above array substrate and the above display panel, and details will not be described here again.

The display device provided by these embodiments integrates touch and display functions, and an exemplary scanning method of the display device will be described in detail below.

The time of a frame is divided into a display phase and a touch phase. In the display phase, gate scanning signals are sequentially applied to each of gate lines of the display device, gray scale signals (digital signals) are applied to data lines, and common voltage signals are applied to common electrodes through touch wirings, so that an electric field is formed between the common electrode and pixel electrode of each pixel unit (pixel region P), liquid crystal molecules are driven to rotate, and the display function is realized. In the touch phase, the touch detection chip applies a driving signal to each touch electrode in a time-sharing manner through a touch wiring electrically connected to the touch electrode, receives feedback signals of each touch electrode, and determines a touch position according to the feedback signals, thereby realizing the touch function.

Figure 8:
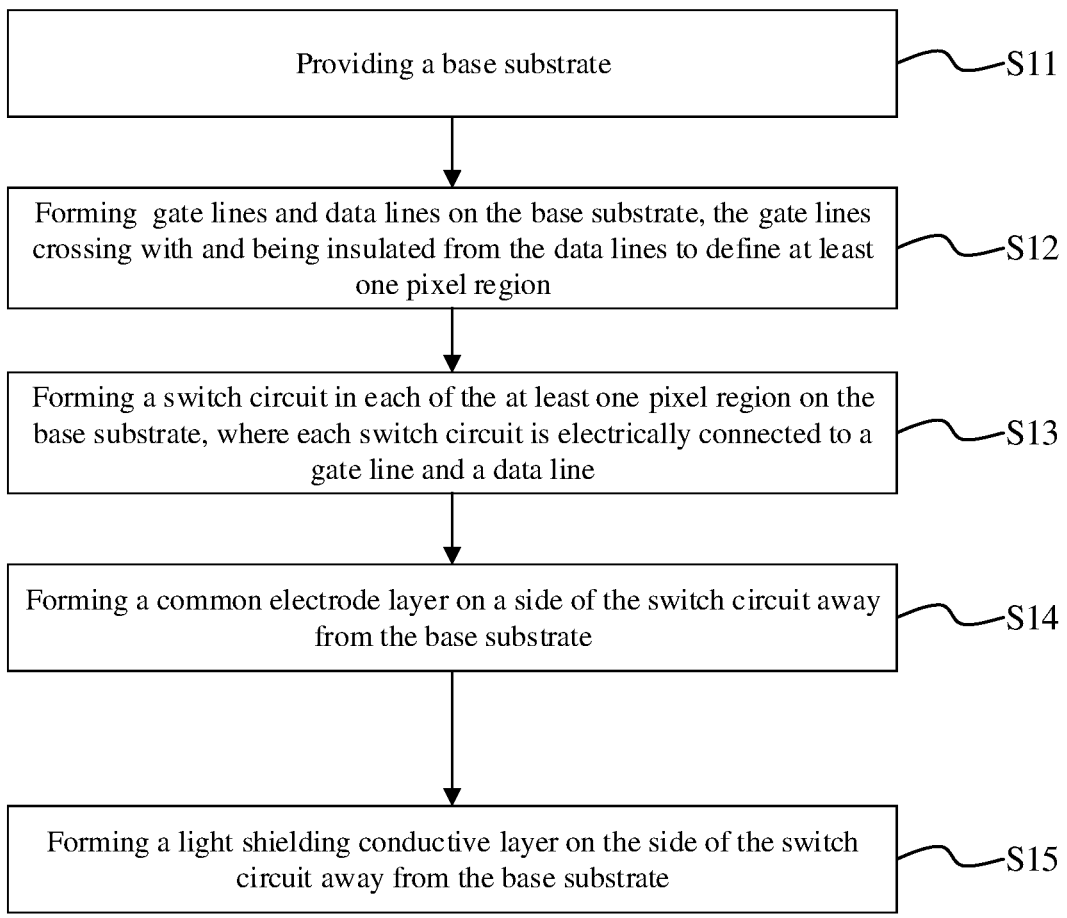
FIG. 8 is a flowchart of a manufacturing method of an array substrate according to at least one embodiment of the present disclosure.

At least one embodiment of the present disclosure further provides a manufacturing method of an array substrate. FIG. 8 is a flowchart of a manufacturing method of an array substrate according to at least one embodiment of the present disclosure. As illustrated in FIG. 8, the manufacturing method includes the following steps.

Step S11: providing a base substrate.

Step S12: forming gate lines and data lines on the base substrate, the gate lines crossing with and being insulated from the data lines to define at least one pixel region.

Step S13: forming a switch circuit in each of the at least one pixel region on the base substrate, where each switch circuit is electrically connected to a gate line and a data line.

Step S14: forming a common electrode layer on a side of the switch circuit away from the base substrate.

Step S15: forming a light shielding conductive layer on the side of the switch circuit away from the base substrate. The light shielding conductive layer is electrically connected to the common electrode layer, and at least a portion of an orthographic projection of the gate lines, the data lines and the switch circuit on the base substrate is within an orthographic projection of the light shielding conductive layer on the base substrate.

It should be noted that the above-mentioned manufacturing method does not necessarily follow the above step sequence, and in some cases, the sequence of the above steps can be changed. For example, in the case where the common electrode layer is located on the side of the light shielding conductive layer away from the switch circuit, step S15 should precede step S14.

In the following, by taking the array substrate 100 illustrated in FIGS. 3A and 3B as an example, the manufacturing method of the array substrate provided by the above embodiment will be further described.

For the array substrate 100 illustrated in FIGS. 3A and 3B, the above step S12 includes the following steps S121 to S123.

Step S121: forming gate lines 102 and gate electrodes 1054 on the first base substrate 101.

Step S122: forming the third insulating layer 1093 on the gate lines 102 and the gate electrodes 1054 to cover the gate lines 102 and the gate electrodes 1054.

Step S123: forming data lines 103 on the third insulating layer 1093. The data lines 103 cross with the gate lines 102 to define at least one pixel region P.

For example, the gate lines 102 and the gate electrodes 1054 can be formed through the same process.

For the array substrate 100 illustrated in FIGS. 3A and 3B, the above step S13 includes the following steps S131 and S132.

Step S131: forming the semiconductor layer 1053, source electrodes 1051 and drain electrodes 1052 on the third insulating layer 1093. Each of the source electrodes 1051 is electrically connected to a data line 103, and the semiconductor layer 1053 is located above the gate electrodes 1054, thereby forming the switch circuit 105.

Step S132: forming pixel electrodes 106 on the third insulating layer 1093. Each of the pixel electrodes 106 is electrically connected to a drain electrode 1052.

For example, the source electrodes 1051, drain electrodes 1052 and data lines 103 can be obtained by the same conductive film (e.g., a metal film) through the same patterning process. The pixel electrode 106 is directly overlapped (i.e., not through the via hole) on the drain electrode 1052 so as to be electrically connected to the drain electrode 1052.

In at least one example, subsequent to forming the switch circuit 105, an interlayer insulating layer is formed on the switch circuit 105, a via hole is formed in the interlayer insulating layer to expose the drain electrode, and the pixel electrode is formed on the interlayer insulating layer and electrically connected to the drain electrode through the via hole.

For the array substrate 100 illustrated in FIGS. 3A and 3B, between steps S13 and S14, the following step S13*a* is further included.

Step S13*a*: forming the second insulating layer 1092 on the switch circuit 105 and the pixel electrode 106 to cover the switch circuit 105 and the pixel electrode 106.

For the array substrate 100 illustrated in FIGS. 3A and 3B, the above step S14 includes the following steps S141 and S142.

Step S141: forming the common electrode layer 107 on the second insulating layer 1092.

Step S142: forming the opening 1053 at a corresponding position, directly above the switch circuit 105, of the common electrode layer 107, and forming the slit 1074 at a position where the common electrode layer 107 overlaps with the pixel electrode 106.

For the array substrate 100 illustrated in FIGS. 3A and 3B, between steps S14 and S15, the following steps S14a and S14b are further included.

Step S14a: forming the first insulating layer 1091 on the common electrode layer 107 to cover the common electrode layer 107.

Step S14b: forming the via hole 110 in the first insulating layer 1091 to expose the common electrode layer 107.

For the array substrate 100 illustrated in FIGS. 3A and 3B, the above step S15 includes the following step.

Step S151: forming the light shielding conductive layer 108 on the first insulating layer 1091. The light shielding conductive layer 108 is electrically connected to the common electrode layer 107 through the via hole 110. At least a portion of the orthographic projection of the gate lines 102, the data lines 103 and the switch circuit 105 on the first base substrate 101 is within the orthographic projection of the light shielding conductive layer 108 on the first base substrate 101.

It should be noted that, in the above manufacturing methods, the pattern of each layer can be realized by processes such as exposure, development, etching and the like in the prior art, and the present disclosure is not specifically limited in this aspect.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. An array substrate, comprising:
    a base substrate;
    a gate line and a data line on the base substrate, wherein the gate line crosses with and is insulated from the data line to define a pixel region;
    a switch circuit, in the pixel region and electrically connected to the gate line and the data line;
    a common electrode layer on a side of the switch circuit away from the base substrate; and
    a light shielding conductive layer, on the side of the switch circuit away from the base substrate and electrically connected to the common electrode layer,
    wherein at least a portion of an orthographic projection of the gate line, the data line and the switch circuit on the base substrate is within an orthographic projection of the light shielding conductive layer on the base substrate,
    wherein the array substrate further comprises an insulating layer between the light shielding conductive layer and the common electrode layer, and
    wherein the insulating layer comprises at least one via hole, and the light shielding conductive layer is electrically connected to the common electrode layer through the at least one via hole.

2. The array substrate according to claim 1, wherein the orthographic projection of the gate line, the data line and the switch circuit on the base substrate is within the orthographic projection of the light shielding conductive layer on the base substrate.

3. The array substrate according to claim 2, wherein the light shielding conductive layer is on a side of the common electrode layer away from the base substrate;
    the switch circuit is a thin film transistor and comprises a channel region; and
    for the pixel region, the common electrode layer is provided with an opening, and the opening overlaps with the channel region in a direction perpendicular to the base substrate.

4. The array substrate according to claim 2, further comprising:
    a pixel electrode in the pixel region,
    wherein the switch circuit is a thin film transistor and comprises a source electrode and a drain electrode, the pixel electrode is electrically connected to the source electrode or the drain electrode, the common electrode layer comprises a common electrode for the pixel region, and the common electrode overlaps with the pixel electrode in a direction perpendicular to the base substrate.

5. The array substrate according to claim 2, wherein the common electrode layer comprises a plurality of common electrode elements insulated from each other, the light shielding conductive layer comprises a plurality of touch wirings insulated from each other, and the plurality of common electrode elements are electrically connected to the plurality of touch wirings in one-to-one correspondence.

6. The array substrate according to claim 1, wherein the at least one via hole is in a region where the light shielding conductive layer overlaps with the switch circuit, the gate line or the data line in a direction perpendicular to the base substrate.

7. The array substrate according to claim 6, wherein the switch circuit is a thin film transistor and comprises a channel region, and
    an orthographic projection of the at least one via hole on the base substrate overlaps with an orthographic projection of the channel region on the base substrate.

8. The array substrate according to claim 1, wherein the light shielding conductive layer is on a side of the common electrode layer away from the base substrate;
    the switch circuit is a thin film transistor and comprises a channel region; and
    for the pixel region, the common electrode layer is provided with an opening, and the opening overlaps with the channel region in a direction perpendicular to the base substrate.

9. The array substrate according to claim 1, further comprising:
    a pixel electrode in the pixel region,
    wherein the switch circuit is a thin film transistor and comprises a source electrode and a drain electrode, the pixel electrode is electrically connected to the source electrode or the drain electrode, the common electrode layer comprises a common electrode for the pixel region, and the common electrode overlaps with the pixel electrode in a direction perpendicular to the base substrate.

10. The array substrate according to claim 1, wherein a material of the light shielding conductive layer comprises a metal material or an organic conductive material.

11. The array substrate according to claim 1, wherein the common electrode layer comprises a plurality of common electrode elements insulated from each other, the light shielding conductive layer comprises a plurality of touch wirings insulated from each other, and the plurality of common electrode elements are electrically connected to the plurality of touch wirings in one-to-one correspondence.

12. The array substrate according to claim 11,
wherein the insulating layer comprises a plurality of via holes, and each of the plurality of common electrode elements is electrically connected to a corresponding touch wiring through at least one of the plurality of via holes.

13. The array substrate according to claim 11, wherein each of the plurality of common electrode elements overlaps with at least two pixel regions in a direction perpendicular to the base substrate.

14. The array substrate according to claim 11, wherein the light shielding conductive layer further comprises a plurality of light shielding elements insulated from each other, and the plurality of common electrode elements are electrically connected to the plurality of light shielding elements in one-to-one correspondence.

15. A display panel, comprising the array substrate according to claim 1.

16. A display device, comprising the display panel according to claim 15.

17. A manufacturing method of an array substrate, comprising:
providing a base substrate;
forming a gate line and a data line on the base substrate, wherein the gate line crosses with and is insulated from the data line to define a pixel region;
forming a switch circuit in the pixel region on the base substrate, wherein the switch circuit is electrically connected to the gate line and the data line;
forming a common electrode layer on a side of the switch circuit away from the base substrate; and
forming a light shielding conductive layer on the side of the switch circuit away from the base substrate,
wherein the light shielding conductive layer is electrically connected to the common electrode layer, and at least a portion of an orthographic projection of the gate line, the data line and the switch circuit on the base substrate is within an orthographic projection of the light shielding conductive layer on the base substrate,
wherein the array substrate further comprises an insulating layer between the light shielding conductive layer and the common electrode layer, and
wherein the insulating layer comprises at least one via hole, and the light shielding conductive layer is electrically connected to the common electrode layer through the at least one via hole.

* * * * *